United States Patent [19]

Richards

[11] 4,300,841
[45] Nov. 17, 1981

[54] PROCESSING OF SILICONE POLYMERS

[75] Inventor: James F. Richards, Portsmouth, N.H.

[73] Assignee: Tredair Industries, Inc., Portsmouth, N.H.

[21] Appl. No.: 137,392

[22] Filed: Apr. 4, 1980

[51] Int. Cl.$^3$ ............................................... B01F 7/02
[52] U.S. Cl. ................................................... 366/98
[58] Field of Search ........................ 366/69, 79, 80, 81, 366/82, 83, 84, 85, 86, 87, 88, 89, 90, 91, 92, 93, 94, 95, 96, 97, 98, 99, 100, 314

[56] References Cited

U.S. PATENT DOCUMENTS

| | | | |
|---|---|---|---|
| 1,290,505 | 1/1919 | Bulley | 366/83 |
| 2,788,196 | 4/1957 | Jacobi | 366/83 |
| 3,130,959 | 4/1964 | Schrenk | 366/69 |
| 3,307,834 | 3/1967 | Wilde | 366/330 |
| 3,677,981 | 7/1972 | Wada | 273/373 |
| 3,727,893 | 4/1973 | Matsuoka | 366/98 |
| 3,854,702 | 11/1974 | Papenmeier | 366/77 |
| 3,875,423 | 4/1975 | Kemper | 366/94 |
| 3,951,389 | 4/1976 | Porter | 366/91 |
| 4,076,220 | 2/1978 | Nakashuma | 366/69 |
| 4,142,804 | 2/1979 | Crocker . | |
| 4,197,070 | 4/1980 | Koschmann | 366/79 |

OTHER PUBLICATIONS

Perry et al., "Chemical Engineer's Handbook", 5th Edition, pp. 21-32, and 21-33.
Perry et al., "Chemical Engineer's Handbook", 3rd Edition, p. 1207.
Henschel Brochure, Fluidizing Mixer, 373MKK3DEF578 N.
Littleford Brochure, Bulletin No. 214, Copyright 1978.
Henschel Mixers Brochure, 3000 U.S.A. 10/77N.

Primary Examiner—Edward J. McCarthy
Attorney, Agent, or Firm—Hamilton, Brook, Smith & Reynolds

[57] ABSTRACT

A method of mixing silicone rubber polymers with fillers and/or other additives without employing a kneading type action wherein the ingredients to be mixed are impacted with a high speed mixing blade for a first period of time in which the blade is operated at a tip speed of about 150 feet per second, until the ingredients are reduced to relatively small uniform particles and then operating the mixer blades at a speed of about 300 feet per second until sufficient viscosity of the material is reached.

5 Claims, 3 Drawing Figures

PROCESSING OF SILICONE POLYMERS

DESCRIPTION

Technical Field

This invention relates to the processing of silicone polymers.

Background Art

Unfilled silicone polymers have negligible strength, therefore, in order to be fabricated into useful products, it is necessary to compound the silicone polymers with fillers, vulcanizing agents or other special additives. In the past, the initial compounding or mixing has taken place on two-roll mills or in low speed internal mixers. A typical compounder of the prior art is shown at page 1208, FIG. 17(c) of the Third Edition of "Chemical Engineer's Handbook" 1950. The "kneader" shown in the referenced text is a mixer of the type supplied by the Baker Perkins Co. and has come to be called a Baker-Perkins mixer. A Baker-Perkins mixer consists of a mixing chamber in which a pair of blades are revolved in opposite directions by an electric motor. The blades are usually shaped in the form of a "sigma" and are of heavy construction. As further stated on page 1220 of the referenced text, the operation of a kneader of the type heretofore used for compounding silicone polymers with filler material is five-fold, in that the design of the kneader causes (1) transport of the material, (2) kneading of the material, (3) tearing (shear), (4) stretching and (5) folding of the material on itself.

One typical Baker Perkins mixer of the type above described has a 500 gallon capacity which can accommodate a 3000 pound charge of silicone polymer and fillers. The processing time for compounding such charge with filler exceeds about six and one-half hours. Typically, such mixers are operated at blade speeds of about 30 revolutions per minute (see page 1208 of the referenced text). Such a mixer also costs in the order of $1,000,000. It is, therefore an object of the present invention to provide a lower cost, faster method and system for compounding silicone polymer with fillers.

Disclosure of the Invention

A silicone polymer compounding system in accordance with the present invention consists of high speed apparatus for mixing random (non-uniform) pieces or chunks of silicone polymer with filler material by propelling the filler material into the silicone polymer at high speeds without the necessity of working or kneading the silicone polymer. In particular, a method is shown wherein random pieces of silicone polymer are introduced together with the filler and, if desired, pigments and/or catalysts in a mixing chamber, the filler and silicone polymer are impacted by mixer blade operated at blade speed of about 1850 rpm until the silicone polymer is reduced to relatively small and uniform particles and subsequently the reduced silicone polymer and filler are impacted at a higher blade speed of about 3600–3800 rpm so as to drive the filler into the silicone polymer without the necessity for a kneading or "working" action.

BRIEF DESCRIPTION OF THE DRAWINGS

The foregoing and other objects, features and advantages of the invention will be apparent from the following more particular description of a preferred embodiment of the invention as illustrated in the accompanying drawings. The drawings are not necessarily to scale, emphasis instead being placed upon illustrating the principles of the invention.

Best Mode of Carrying Out the Invention

Heretofore low speed "kneading" type mixers have been used in the prior art to compound silicone polymers with various fillers and pigments.

Figure 1:
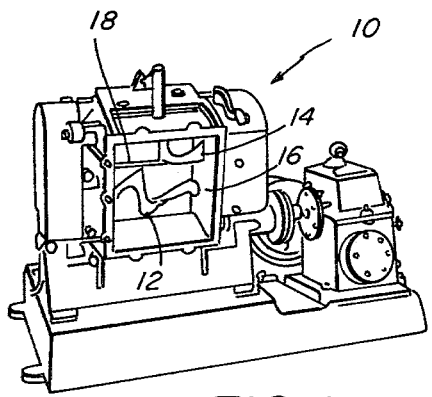
FIG. 1 is an illustration of a typical Baker-Perkins type mixer such mixer being heretofore used in the prior art to accomplish compounding of silicone polymer with fillers.

Referring now to FIG. 1, a typical Baker Perkins mixer or kneader (10) is shown having two arms or blades 12 and 14 rotating in opposite directions in container 16 with a divided trough 18 or saddle. The blades are fashioned from heavy durable material in the form of slightly helical "sigmas." The blade shafts used in silicone polymer compounding are almost the same size as the blades themselves. It can therefore be seen that such mixers are extremely costly to manufacture and are normally only capable of operating at low blade speeds of about 30 revolutions per minute. Furthermore, as previously stated, the cost of a mixer having a 500 gallon capacity is in the order of $1,000,000 and the processing time for compounding is about six and one-half hours.

Figure 2:
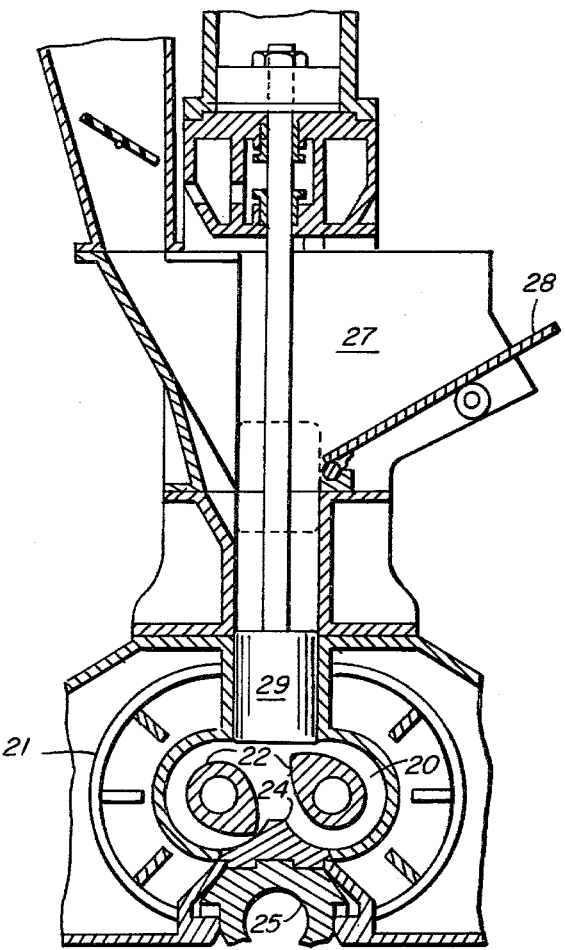
FIG. 2 is an illustration of a typical Banbury type mixer as shown in U.S. Pat. No. 3,951,389, such a mixer being heretofore used in the prior art to accomplish compounding of filled silicone polymers with extenders after the initial compounding which normally occurs in a Baker Perkins type mixer.

Another type of mixer is shown in FIG. 2. The mixer of FIG. 2 is known as a Banbury type mixer. This type of mixer is normally used after the initial compounding of silicone polymers with fillers is accomplished in a Baker Perkins mixer. The filled silicon polymer is removed from the Baker Perkins mixer and then processed in a Banbury type mixer by infusers or fabricators who further process the compound by adding "extruders" to reduce cost.

Referring now to FIG. 2, a mixing chamber 20 is shown which is surrounded by heating jacket 21 to permit the circulation of water or other fluid for controlling the temperature of the materials being mixed in the chamber. Within the chamber are a pair of rotors 22 which are revolved in opposite direction by electrical motors not shown. The lower portion of the mixing chamber 20 is provided with a ridge 24 which forms part of closure member 25 for the bottom of the mixing chamber. Materials to be mixed are introduced into the chamber 20 through a load opening 27 which has a movable wall 28 disposed in the position shown in full lines in FIG. 2. The apparatus also incorporates a pressure ram 29 for imposing pressure upon the material in the mixing chamber. Previously filled silicone polymer extenders are introduced through opening 27 into the mixing chamber where the ingredients are subjected to mechanical working by the rotors 22. The material is confined in the mixing chamber by the ram 29 when it is disposed in its lower position as shown. After the filled silicone polymer has been worked with extenders to an appropriate extent other ingredients may be added at intervals by sequentially moving the ram to its other upper position such that the ingredients may be introduced through opening 27. The disadvantage of a Banbury mixer is that it is slow in operation and expensive to make and has not found application for use as a dispersion mixer for mixing fumed silica with pure silicone polymer. The average process cycle for such a load is about 12 minutes. Such a typical Banbury mixer costs approximately $250,000 to $300,000 installed.

In the apparatus of the present invention, a high speed fluidizing mixer having an 800 pound load size and 160 gallon capacity, such as has heretofore been used for the mixing of small plastic powders or pellets with plasticizers is utilized. Such a mixer can be purchased for about $50,000. In the past, such high speed fluidizing mixers were used merely to coat or disperse ingredients such as plasticizers, pigments or fillers around very small plastic granules or pellets. The ingredients, including the granules or pellets consisted of fine particle size ingredients of relative uniformity. Heretofore, it has apparently not been deemed possible or feasible to utilize such fluidizing mixers for compounding silicone polymers with fillers. One reason for the failure to consider this approach may reside in the disparity between the large size polymer chunks to be mixed with fine fumed silica particles used in silicone polymer compounding versus the small uniform size of the particles of plasticizers and plastic pellets which have been heretofore mixed in fluidizing mixers. Another reason may reside in the notion that it was necessary for proper dispersion of the silicone polymer with the filler to utilize all five operations of the Baker Perkins kneader type mixer, that is, transporting, kneading, tearing (shearing), stretching and folding.

Figure 3:
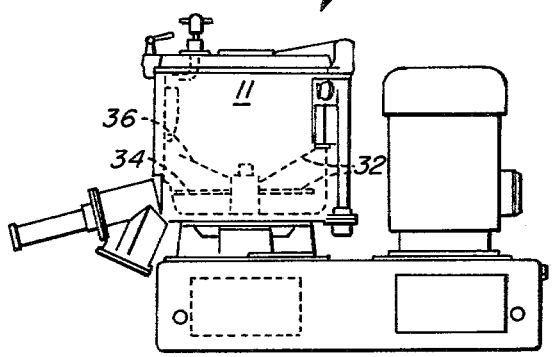
FIG. 3 is an illustration of a high speed fluidizing mixer of the type manufactured by Henschel or Littleford Companies and previously used for the dispersion of chemical plasticizers and pigments with basic thermoplastic resins but which have not heretofore been used as disclosed in this invention for the compounding of silicon rubber.

In constrast, as can be seen with reference to FIG. 3, the operation of the present invention is a much simpler faster and less expensive process. The mixer consists of a standard fluidizing mixer supplied by, for example, Littleford Bros., Inc. A pair of blades (32) are rotated at high speed creating a high intensity whirlpool mixing action. The movement in this action is both vertical and horizontal. This results in complete mixing which yields a uniform batch. As can be seen in the drawing of FIG. 3, one of the blades 34 is disposed parallel to the bottom surface of the mixer and the other blade 36 is inclined at an angle with respect to the bottom surface.

In the apparatus of the present invention, all compounding ingredients are added to the mixer chamber 11 in one addition. The mixer 16 is turned on at low speed of about 1850 rpm (for a 20-foot blade, this corresponds to a blade tip speed of about 150 ft. per second) for about one-half to three minutes, then switched on to high speed about 3600 rpm (corresponding to a blade tip speed of about 300 ft. per second). The mixer operator notes the mixer power consumption on an appropriate power meter (not shown). When the power meter shows a substantial increase usually in four to eight minutes after switching to high speed the batch is considered to be appropriate for mill sheeting. The operator then dumps a load onto a two-roll mill for sheeting off. The mixer load product is similar to products processed in a Baker Perkins type mixer.

A typical composition that can be mixed or compounded in accordance with the invention would consist of a hundred parts of silicone polymer such as methyl vinyl polysiloxane, fifteen parts fine powdery filler such as fumed silica, eighty parts extending filler such as "Minusil" TM, two parts plasticizer and three parts pigment. It should be noted that the silicone polymer chunks as first introduced to the mixer may range in size from large chunks of 10-15 pounds to about 1 ounce pieces. All of the ingredients would be loaded into a fluidizing mixer such as shown and described in FIG. 3. The mixer is then operated at a low starting speed of 1850 revolutions per minute corresponding to a blade tip speed of about 150 ft. per second until the chunks of polysiloxane have been reduced to small sizes as indicated by the fact that the mixer will stop vibrating and start to run smoothly. This normally takes approximately one minute for a 350 pound load. At this point, the mixer is switched to a high speed of 3800 revolutions per minute (blade tip speed of 300 ft. per second) and run until the power requirements increase. The amount of power increase will vary depending on compound formulation. Normally, this takes about six to eight minutes at high speed and then the mixture is dumped.

TM Trademark of Pittsburgh Glass Sand Co. for ground quartz.

While the invention has been particularly shown and described with reference to a preferred embodiment thereof, it will be understood by those skilled in the art that various changes in form and details may be made therein without departing from the spirit and scope of the invention as described by the appended claims. For example, while the term silicone polymer is used throughout, it is contemplated that any silicone rubber polymer such as organosilicone, fluorosilicone, organofluorosilicone polymers or copolymers may be mixed with fillers as described herein. Such fillers may include, but are not limited to: precipitated silica, fumed silica, carbon blacks, iron oxides, calcium carbonates, titanium dioxide, zinc oxides, diatomaceous earths, zirconium silicates and ground quartz.

I claim:

1. The method of compounding silicone polymers with fillers comprising:
   introducing the filler and random pieces of unreinforced silicone polymers into a mixing chamber;
   impacting the filler and silicone polymer with a high speed mixer blade at a first speed until the silicone polymer is reduced to relatively small and uniform particles;
   subsequently operating the mixer blade at a higher speed in the order of twice the lower speed to drive the filler into the silicone polymer without kneading of the material.

2. The method of claim 1 wherein the first blade tip speed is in the order of 150 feet per second.

3. The method of compounding silicone polymers as claimed in claim 2 wherein the filler consists of fumed silica.

4. The method of compounding silicone polymers as claimed in claim 3 wherein the size of the silicone polymer pieces is in excess of one ounce and the mixing blades are about 20 inches in diameter.

5. A method of compounding silicone polymers with fillers as claimed in claim 4 wherein the mixer is operated at the first speed for approximately one minute and at the second speed for a period of between six and eight minutes.

* * * * *